3,167,546
2-SUBSTITUTED 16α,17α(LOWER ALKYLIDENE-DIOXY)PREGNADIENES
Seymour Bernstein, New City, N.Y., and George Rodger Allen, Jr., Old Tappan, N.J., assignors to American Cyanamid Company, Stamford, Conn., a corporation of Maine
No Drawing. Filed Apr. 4, 1963, Ser. No. 270,535
5 Claims. (Cl. 260—239.55)

This invention relates to new steroid compounds. More particularly, it relates to 2-substituted 16α,17α-(substituted methylenedioxy)-4,9(11)-pregnadienes and methods of preparing the same.

It has been shown in the past that 16α,17α-isopropylidenedioxy pregnanes can be prepared from the corresponding 16α,17α-dihydroxy pregnane [Journal of the Chemical Society, 4373 (1955)].

We have now found that substituted methylenedioxy steroids having the following formula are useful as intermediates.

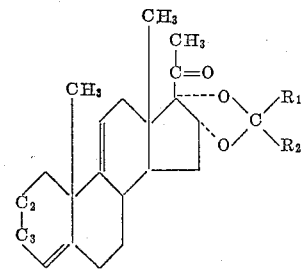

wherein $R_1$ and $R_2$ are lower alkyl radicals and

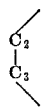

is selected from the group consisting of:

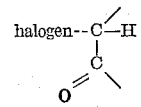

and

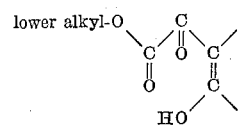

radicals.

The compounds of the present invention are, in general, crystalline solids and insoluble in water. They are crystallizable from organic solvents such as toluene, benzene, petroleum ether and the like or mixtures of organic solvents such as benzene-toluene, acetone-petroleum ether or acetone-benzene.

The compounds of the present invention can be prepared as shown in the following flowsheet.

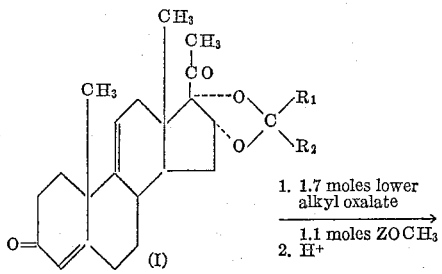 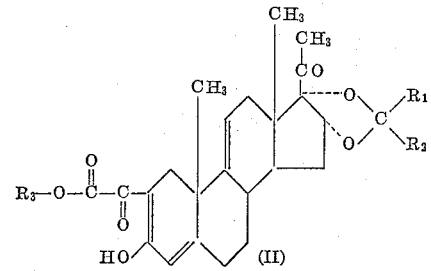

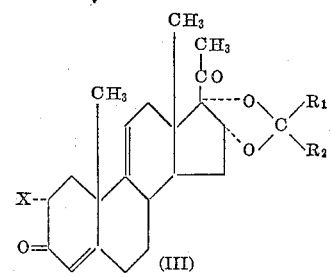

In the above, $R_1$ and $R_2$ are as hereinbefore defined, X is chlorine, bromine or iodine and Z is an alkali metal.

In the above flowsheet, compound of Formula II are prepared as their alkali metal derivative by the interaction of (I) with about 1.7 molar equivalents of an alkyl oxalate and about 1.1 molar equivalents of a base, such as an alkali metal alkoxide (preferably, sodium methoxide) or an alkali metal hydride (for example, sodium hydride) or the like in an inert solvent, such as benzene, at room temperature for one to 24 hours. The alkali metal derivatives separate as a solid during this time. These metal derivatives usually dissolve in water to give a solution which produces a positive enol test with an aqueous or alcoholic solution of ferric chloride. The compounds of Formula II are isolated from this solution as amorphous solids by the addition of a mineral acid solution. Although it is known that position C-2 in 3-keto steroids is susceptible to condensation reactions, it has hitherto been considered that condensation occurs preferentially at position C–21 in 3,20-diketo steroids. It is therefore unexpected that an alkyl oxalate would react preferentially at position C–2 in the 3,20-diketosteroid represented by Formula I.

The 2-alkoxayly-Δ⁴-3-keto derivatives may exist in any of several tautomeric forms, as indicated below.

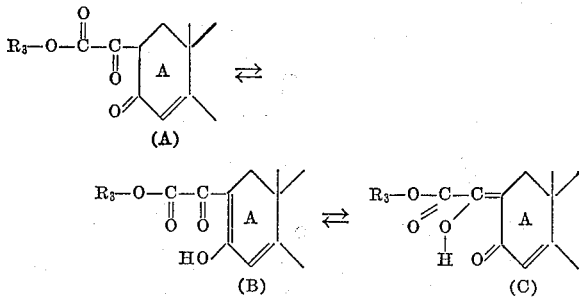

wherein $R_3$ is a lower alkyl radical. On the basis of infrared and ultraviolet spectroscopic evidence, it appears that the compounds of this invention are most likely represented by tautomeric form (B). On the other hand, if it should be found that the stable tautomeric form is one of the other configurations, the application should not be considered in any way defective. This invention is also intended to encompass the alkali metal salts of the alkoxalyl derivatives.

Treatment of the 2-alkoxalyl derivatives, preferably in a methanolic alkali metal acetate solution, with halogen, such as chlorine, bromine or iodine, preferably dissolved in an inert medium, and subsequent de-alkoxalylation by treatment with base, such as the metal salts of acetate, hydroxide or alkoxide, produces the 2α-halogen derivatives (III).

The intermediates produced in the flowsheet are converted into active steroids as described hereinafter in the examples.

The compounds of the present invention are useful intermediates in preparing physiologically active steroids possessing glucocorticoid and anti-inflammatory activity. The active steroids can be used systemically and topically in the treatment of rheumatoid arthritis, burns, allergies, psoriasis and other skin disorders.

This application is a continuation-in-part of our co-pending application Serial No. 202,708, filed June 15, 1962, now United States Patent No. 3,111,516, which, in turn, is a continuation of application Serial No. 720,564, filed March 11, 1958, now abandoned.

The following examples describe the present invention in greater particularity and are intended to be by way of illustration and not limitation.

EXAMPLE I

*Preparation of 2-ethoxalyl-3-hydroxy-16α,17α-isopropylidenedioxy-2,4,9(11)-pregnatrien-20-one*

A solution of osmium tetroxide (10 g.) in benzene (200 ml.) is added dropwise (one drop per second) with stirring to a solution of 4,9(11),16-pregnatriene-3,20-dione (11.6 g.) in benzene (340 ml.) and pyridine (6 ml.). After addition, stirring is continued for one hour. Methanol (380 ml.) is added, followed by a solution of sodium sulfite (54 g.) and potassium hydrogen carbonate (54 g.) in water (560 ml.). The mixture is stirred for three hours and then further for one-half hour after addition of chloroform (500 ml.). The organic layer is separated from the filtered reaction mixture and combined with the chloroform extracts (3×250 ml.) of the aqueous layer, the chloroform having been previously used in washing the filter cake. The combined chloroform is washed with water (500 ml.), dried over anhydrous magnesium sulfate and removal of solvent gives a greenish-yellow solid which is washed with a little methanol and dried. The solid which is recovered weighs 11 grams and melts at 209–215° C. A specimen of this material crystallizes as prisms, melting point 211–215° C. from chloroform methanol. The same specimen melts at 215–220° C. after being dried overnight at the temperature of boiling xylene.

One gram of the product of the foregoing reaction, 16α,17α-dihydroxy-4,9(11)-pregnadiene-3,20-dione, is dissolved in acetone (25 ml.). Hydrochloric acid (three drops, d. 1.19) is added to the solution which is then boiled gently for two minutes. After the reaction mixture is kept at room temperature for eighteen hours, the product is separated by addition of water (75 ml.) followed by ether extraction (3×50 ml.), the combined extracts being washed with aqueous sodium hydrogen carbonate solution (50 ml.), water (50 ml.) and then is dried over anhydrous sodium sulfate. The 16α,17α-isopropylidenedioxy derivative recovered melts at 200–201° C.

A solution of 25 ml. of 1 N sodium methoxide in 100 ml. of anhydrous benzene is distilled until 75 ml. of distillate is collected. The residual mixture is allowed to cool to room temperature, diluted with 40 ml. of benzene and is treated with 6.00 g. (0.041 mole, 5.54 ml.) of ethyl oxalate during which time the mixture is stirred magnetically. The solid immediately dissolves and 9.30 g. (0.024 mole) of 16α,17α-isopropylidenedioxy-4,9(11)-pregnadiene-3,20-dione, the product of the previous reaction, is added. The solution becomes darker; and after one hour solid begins to precipitate from the solution. The mixture is stirred at room temperature for twenty-one hours. One hundred milliliters of ether is added, and the mixture is stirred for one hour. An additional 200 ml. of ether is added, and stirring is continued for three hours. The mixture is filtered to give 6.74 g. of crude sodium salt of 2-ethoxalyl-16α,17α-isopropylidenedioxy-4,9(11)-pregnadiene-3,20-dione. The filtrate is evaporated to a syrup which is triturated with 100 ml. of ether. Filtration gives an additional 2.735 g. of the crude sodium salt.

The above batches of crude sodium salts are combined and dissolved in 400 ml. of water. The turbid solution is filtered and the filtrate is acidified with 5% hydrochloric acid solution. The precipitate is collected by filtration and dried over phosphorus pentoxide to give 7.919 g. of pale yellow amorphous solid, ultraviolet spectrum;

$\lambda_{max.}^{MeOH}$ 242 m$\mu$, 252 m$\mu$, ($\epsilon$ 14,200; 9500); $\lambda_{max.}^{0.1 N\ HCl}$ 245 m$\mu$, 323 m$\mu$ ($\epsilon$ 14,500; 2420); $\lambda_{max.}^{0.1 N\ NaOH}$ 245 m$\mu$, 352 m$\mu$ ($\epsilon$ 14,500; 11,000)

EXAMPLE II

*Preparation of 2α-bromo-16α,17α-isopropylidenedioxy-4,9(11)-pregnadiene-3,20-dione*

A solution of 3.20 g. (0.0326 mole) of potassium acetate in 100 ml. of methanol is chilled in an ice-bath during magnetic stirring. The product [7.917 g. (0.0163 mole)] described in the previous example, the 2-ethoxalyl derivative of 16α,17α-isopropylidenedioxy-4,9(11)-pregnadiene-3,20-dione, is added to the potassium acetate solution using 20 ml. of methanol to aid in the transfer. A 19.8 ml. aliquot of a solution prepared by diluting 6.60 g. of bromine to 50 ml. volume with carbon tetrachloride is added dropwise over 50 minutes (the aliquot being equivalent to 0.0163 mole). The resulting turbid yellow solution is treated with 100 mg. of phenol and 16.3 ml. of 1 N sodium methoxide in methanol. The solution is allowed to reflux during ten minutes on a steam bath and then is chilled in an ice bath. The crystals are collected by filtration, yield: 4.732 g. of pale yellow solid melting at 175–179° C. (dec.). An additional 2.420 g. of crystals melting at 179–183° C. (dec.) (95% yield) is recovered from the mother liquor. The material can be used for subsequent work without further purification.

A sample (0.500 g.) of the material described in the foregoing paragraph is dissolved in 7 ml. of benzene and chromatographed on 15 g. of silica gel (column size: 16 x 140 mm.). The column is washed with 100 ml. of benzene and the washings discarded. The column is then washed with 250 ml. of a solution of three parts ether and 97 parts benzene. Fifty milliliter percolates are collected and percolates 2, 3 and 4 are combined and concentrated to dryness under reduced pressure. The residue is dissolved in methanol and recrystallized giving 0.303 g. of glistening white plates melting at 177–179° C. (dec.). When this material is dried under reduced pressure at 56° for two hours, it becomes colored. Consequently, the the analytical sample is dried at room temperature, $[\alpha]_D^{25}$ +122° (c. 0.98, chloroform);

$\lambda_{max.}^{MeOH}$ 241 m$\mu$ ($\epsilon$ 16,300); $\lambda_{max.}^{KBr}$ 5.85$\mu$, 5.90$\mu$, 6.09$\mu$, 6.17$\mu$, 7.30$\mu$, 8.54$\mu$, 9.58$\mu$

EXAMPLE III

*Preparation of 9α-bromo-11β-hydroxy-16α,17α-isopropylidenedioxy-1,4-pregnatriene-3,20-dione*

A solution of 7.243 g. (0.0156 mole) of the product described in Example II in 15 ml. of 2,4,6-collidine is refluxed for 45 minutes. A solid begins precipitating from the solution almost immediately and the mixture becomes dark. The cooled mixture is diluted with sufficient ether to make the total volume 80 ml. Filtration gives crude 2,4,6-collidine hydrobromine which is washed with 100 ml. of ether. The washing and filtrate are combined, and the resulting solution is washed first with 10% sulfuric acid and then with water. The washes are combined and extracted with 100 ml. of ether. The ether solutions are then combined and dried over a mixture of activated charcoal and anhydrous magnesium sulfate. The mixture is filtered and concentrated to dryness, giving 3.231 g. of needles melting at 196.0–198.5° C. A sample is recrystallized three times from acetone-petroleum ether to give purified 16α,17α - isopropylidenedioxy-1,4,9(11) - pregnatriene-3,20-dione in the form of fine white needles melting at 204.5–205.5° C.

A solution of 2.179 g. (5.7 mol.) of 16α,17α-isopropylenedioxy - 1,4,9(11) - pregnatriene - 3,20 - dione in 62 ml. of peroxide-free dioxane and 12 ml. of water is chilled to 15° C. The solution is treated with 10.7 ml. of 20% perchloric acid solution and 0.980 g. (7.1 moles) of N-bromoacetamide. The solution is then allowed to stand at room temperature for thirty minutes, treated with 25 ml. of of saturated sodium sulfite solution, and diluted with sufficient water to make the total volume 250 ml. This mixture is extracted three times with 150 ml. each time of methylene chloride. The three extracts are dried over magnesium sulfate and concentrated to about 15 ml. in volume. The solid which separates is collected by filtration and washed with 10 ml. of methanol to give 1.585 g. of crystals melting at 218–221° C. (dec.) (after darkening from 195° C.). The mother liquor gives an additional 0.25 g. of product. The product is recrystallized from acetone to give white crystals melting at 219.0–220.5° C. (dec.), (after darkening from 195° C.); $[\alpha]_D^{25}$ +115° (chloroform); ultraviolet spectrum;

$\lambda_{max.}^{MeOH}$ 242 m$\mu$ ($\epsilon$14,700)

EXAMPLE IV

*Preparation of 9α-fluoro-11β-hydroxy-16α,17α-isopropylidenedioxy-1,4-pregnadiene-3,20-dione*

A solution of 1.20 g. (2.5 mols) of the product of Example III, 9α-bromo-11β-hydroxy-16α,17α-isopropylidienedioxy - 1,4 - pregnadiene-3,20-dione, and 1.20 g. of anhydrous potassium acetate in 180 ml. of ethanol is refluxed for sixteen hours. The solution is concentrated to near dryness and the moist residue is triturated with 50 ml. of water. The mixture is filtered to give 0.947 g. of near white solid melting at 238–242° C.

A solution of 0.636 g. (1.60 mols) of the product of the previous paragraphs, 9β,11β-epoxy-16α,17α-isopropylidenedioxy - 1,4 - pregnadiene - 3,20 - dione, in 6 ml. of methylene chloride and 10 ml. of tetrahydrofuran is chilled to −30° C. while in a stainless steel bomb. To this solution there is added a solution of 5 ml. of hydrogen fluoride in 5 ml. of methylene chloride, the solution having been chilled to −30° C. The bomb is sealed and shaken at 5° C. for eighteen hours. The contents of the bomb are poured into 100 ml. of saturated sodium bicarbonate solution contained in a stainless steel beaker, the bomb is rinsed with 60 ml. of chloroform twice, and the rinsings are combined with the above mixture. The organic layer of the two-phase system is separated and washed twice with 50 ml. each time of saturated sodium chloride solution. The washed solution is concentrated to dryness under vacuum, and the moist residue is triturated with 7 ml. of acetone. The mixture is filtered to give 0.488 g. of a solid melting at 294–296° C. (dec.). The material is recrystallized from acetone-petroleum ether to give shiny white platelets melting at 294–296° C.

EXAMPLE V

*Preparation of 9α-fluoro-11β,16α,17α-trihydroxy-1,4-pregnadiene-3,20-dione*

A mixture of 0.318 g. of 9α - fluoro - 11β - hydroxy-16α,17α - isopropylidenedioxy-1,4-pregnadiene-3,20-dione (Example IV), 40 ml. of methyl alcohol, 15 ml. of water and 5 ml. of hydrochloric acid (37%) is allowed to reflux during a three hour period. The solution is diluted with 40 ml. of water and concentrated under reduced pressure on the steam bath until a solid begins to separate. This material is collected by filtration and dried under reduced pressure over phosphorous pentoxide to give 0.233 g. of a white solid melting at 268–283° C. with decomposition. The product is recrystallized from acetone-petroleum ether to give 0.130 g. of white needles melting at 291°–293° C., dec. An analysis of the product shows that the values for carbon, hydrogen and fluorine agree closely with the theoretical value.

We claim:
1. A compound of the formula:

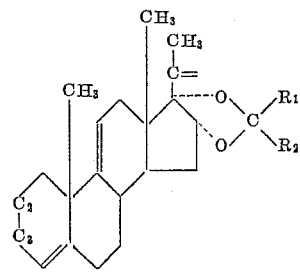

wherein $R_1$ and $R_2$ are lower alkyl and

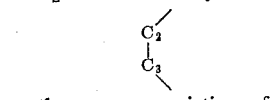

is selected from the group consisting of:

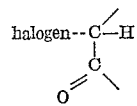

and

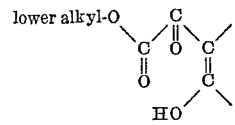

2. The compounds 2-ethoxalyl - 16α,17α - (lower alkylidenedioxy)-3-hydroxy - 2,4,9(11) - pregnatriene - 20-dione.

3. The compound 2 - ethoxalyl - 3 - hydroxy - 16α,17α-isopropylidenedioxy-2,4,9(11)-pregnatrien-20-one.

4. The compound 2α - bromo - 16α,17α - isopropylidenedioxy-4,9(11)-pregnadiene-3,20-dione.

5. The sodium salt of 2-ethoxalyl - 16α,17α -isopropylidenedioxy-4,9(11)-pregnadiene-3,20-dione.

No references cited.